United States Patent Office 3,572,118
Patented Mar. 23, 1971

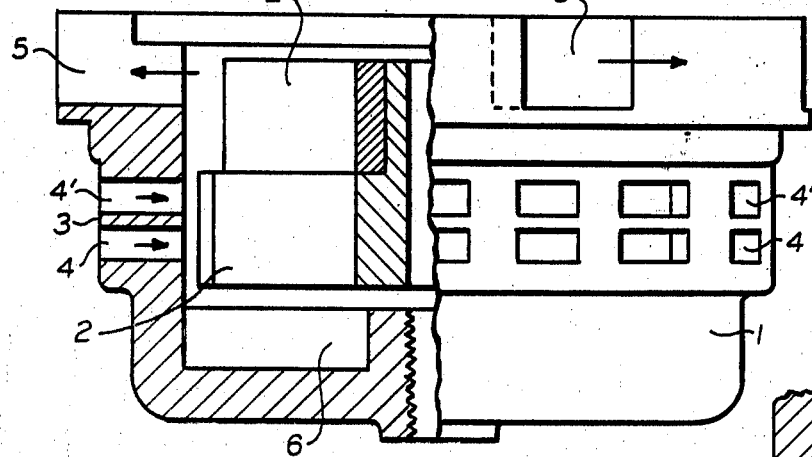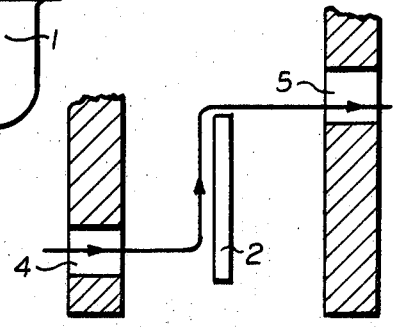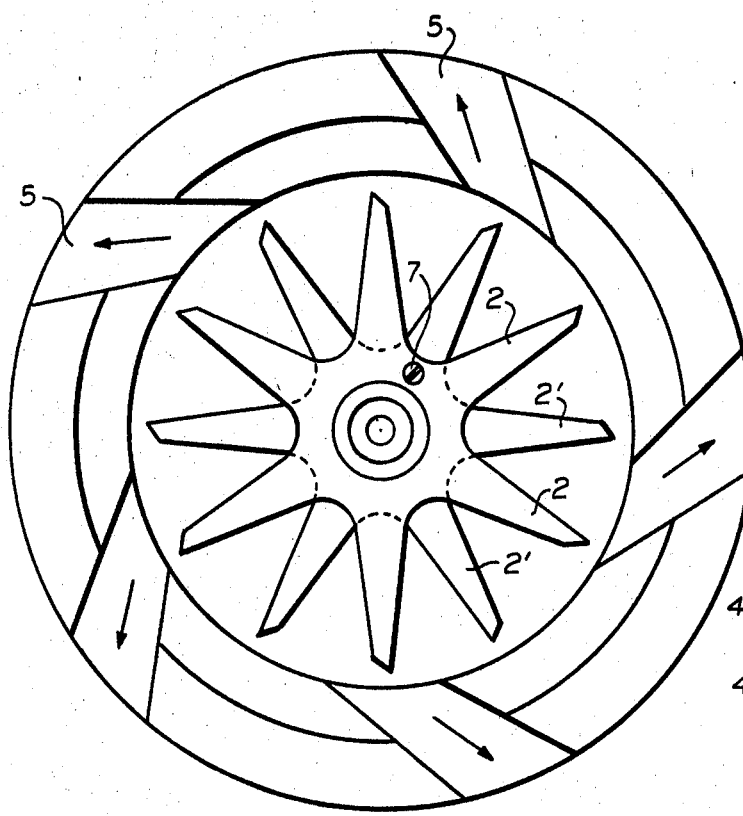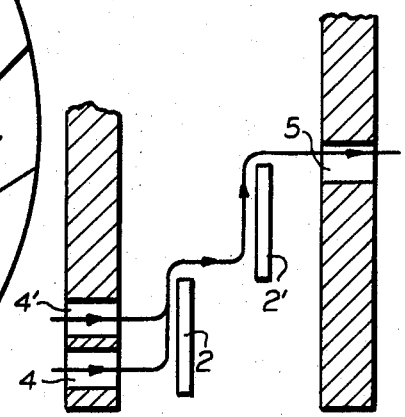
INVENTOR
WIFRIED HIZENDEGEN
BY
BURGESS, DINKLAGE & SPRUNG
ATTORNEYS.

3,572,118
TURBINE-WHEEL WATERMETER
Wilfried Hilzendegen, Weingarten, Baden, Germany, assignor to Paul Neuhoff & Co. GmbH, Weingarten, Baden, Germany
Filed May 7, 1969, Ser. No. 822,517
Claims priority, application Germany, May 25, 1968,
P 17 73 498.4
Int. Cl. G01f 1/08
U.S. Cl. 73—229                                3 Claims

ABSTRACT OF THE DISCLOSURE

An improved turbine-wheel type meter comprises two freely rotatable turbine meter wheels on a common shaft in a suitable housing. The wheels are angularly adjustable with respect to one another from a matching position to one of maximum offset. A multiplicity of paired inlet orifices around the periphery of the housing direct the fluid to be measured tangentially against the blades of one of the wheels, and outlet passageways remove discharged fluid from the vanes of the other wheel.

PRIOR ART

In the field of domestic watermeters, there is an increasing trend toward the development of so-called multiple-range meters. In the known class of multiple-stream turbine or vane-wheel meters there are types in which two adjacent nominal magnitudes, e.g., magnitudes 3 and 5 or 7 and 10 (m.$^3$/h.), are combined in one meter.

The possibility of constructing such meters has been based practically on the choice of an injection-moldable plastic that produces very smooth surfaces, in conjunction with known tapering passages of rectangular cross section, for the formation of the vessel of the measuring mechanism. There is a practical limit, however, of what can be achieved with this type of construction.

In the multiple-jet turbine-wheel meters of the prior art, the direct driving of the meter wheel vanes in the tangential direction has been performed only at the lower third of their total height, where the 90° deflection of the current takes place, resulting in the rotation of the meter wheel, while at their upper portion, to a degree that increases with the height of the turbine, an effect occurs which hampers the operation of the meter wheel, i.e., reduces its ease of rotation. Because of the unfavorable distribution of the forces acting on the bottom bearing and top bearing of the meter wheel shaft, the running of the meter wheel is uneven, and a relatively great retarding moment is produced.

The above-mentioned disadvantages are an obstacle to the enlargement of the range of measurement of the meters and to efforts directed to the creation of multiple-range meters.

Literature that is considered pertinent with respect to the state of the art is:

(1) Fr. Himmler, "Wassermessung durch Wasserzaehler," vol. 9 of the "GWF-Schriftenreihe" published by R. Oldenbourg, Munich, 1961, page 28, lines 16–26, and (2) "Neue Deliwa-Zeitschrift" of Dec. 1, 1967, page 608.

THIS INVENTION

In the present invention, a multiple-jet turbine-wheel meter having tangentially driven meter wheel blades, has the meter wheel blades in the form of a pair of horizontal parts set flush one on the other, which vanes are adjustable relative to one another and which can be affixed to one another in a predetermined relationship.

The inlet passages to the chamber containing the blades form at least two congruently superimposed levels separated from one another by a floor and are directed exclusively against the blades of the lower of the two.

The construction of the invention has several advantages.

The two-level construction of the inlet passages of the vessel of the meter imparts a drive to the lower of the two parts of the meter wheel which is equal over the entire height of this part. This contributes to the smooth running of the entire meter wheel system.

The novel construction of the meter wheel makes it possible to offset the blades of the wheel parts from one another to any desired extent within given limits. Any variation in this offset produces a change in the flow of the liquid as regards the course it follows and the distribution of the velocities within it as it passes toward the outlet passages of the meter vessel, and hence it produces a change in the thrust imparted to the meter wheel. The greater the angle formed between the blades of the two parts is, the more favorable the conditions are, because a greater angle increases the effect of the second deflection of the stream by the second vane, and this results in a second thrust on the upper half-vane of the meter wheel. By varying the angle of offset between the two turbine parts or halves, the velocity distribution of the flow inside of the meter vessel can be varied, and with it the rotational speed of the meter wheel can be varied one way or another.

Such variability is not achievable with the turbine-wheel meters of the prior art. Any desired change would require a change in the turbine height and in the diameter of the meter wheel, and hence also the use of a meter vessel of different dimensions.

In short, a meter having a measuring mechanism that operates according to the invention and is adjustable as regards the angle of offset of the two halves of the meter wheel is distinguished from multiple-jet meters of conventional construction both by its smoother operation and by its prompter response, and also by its accordingly lower measuring-range limit. It is important to note in this regard that this effect is the result exclusively of the measures proposed by the present invention, i.e., without having recourse to any of the above-mentioned means of the prior art directed to the reduction of the total friction resistance (such as glossy plastic passage surfaces etc.).

The aforesaid properties result directly in another advantage for the new meter construction, namely the advantage that the meter wheel can be used in meters of different capacity without the necessity of making changes in its dimensions (diameter and height).

THE DRAWING

An example of the embodiment of the invention is represented in the drawing. In all of the figures, identical or equivalent parts are identified by the same reference numbers.

FIG. 1 shows a meter vessel in a side elevation on the right and in a cut-away view on the left; FIG. 2 shows a top view of the arrangement shown in FIG. 1 with the cover removed from the vessel;

FIG. 3 shows the flow pattern in a prior-art type of meter; and

FIG. 4 shows the flow pattern in the meter of the present invention.

DESCRIPTION AND EXAMPLE

With reference to FIGS. 1 and 2, reference number 1 identifies the meter vessel. The meter wheel 2 mounted therein is a multi-turbine wheel and consists, in a novel manner, of two parts, 2 and 2', mounted flush one on the other while being adjustable relative to one another and then affixed together as by a fastening means, such as splines on the shaft or a set screw 7. In the lower portion of the walls of the vessel are paired inlet passages, which taper in the manner of nozzles and are aimed approximately tangentially to the vanes of the meter wheel. Each of the passages forms a pair of congruently superimposed levels 4, 4', separated from one another by a floor 3.

The outlet passages 5 are located in the top part of the meter vessel 1. Only for the sake of completeness are baffle ribs 6 illustrated, of the kind usually used in the bottom of the vessel of multiple-jet turbine-wheel meters These ribs are not a subject of the invention. They have been omitted from FIG. 2 lest they interfere with the understanding of the drawing.

In the drawing, it is assumed that the meter is running forward. The lower part 2 of the turbine wheel system 2, 2', is directly driven over its entire height by the liquid being measured, which enters through the two circular rows 4, 4', of input passages (see FIG. 4), while the upper part 2' serves mainly to influence the course of the flow, and to regulate the velocity and pressure drop. The upper part 2' of the turbine wheel system can thus be regarded as a constructional means for influencing the Reynolds number and hence for influencing the results of the measurement and the error characteristic of the meter. In FIGS. 1 and 2, the arrangement is such that the vanes of the upper wheel part 2' are precisely centered between those of the lower part 2 (maximum offset angle). When the meter runs backward, it is the upper part of the meter wheel system that serves as the actual measuring wheel, while the lower one serves mainly to influence the conditions of flow and hence the error characteristic of the meter.

FIGS. 3 and 4 are diagrammatic representations and assume that the meter is running forward, and they show how the current flows between the inlet orifices and the outlet orifices of the meter vessel.

FIG. 3 shows the flow in the prior-art design of the meter mechanism, and hence there is only one deflection of the current of liquid being measured, while FIG. 4 shows the flow when a meter mechanism according to the present invention is used in which the blades of the two parts of the wheel are at the maximum angle of offset from one another; in the latter case, after the current is deflected at the turbine surfaces of the lower wheel, part 2, it returns to the horizontal plane to flow with further increased velocity to the blades of the upper wheel part 2', where it is again deflected upwardly.

What is claimed is:

1. A turbine wheel meter for fluids comprising a circular chamber, two freely rotatable turbine meter wheels therein on a common shaft and adapted to be angularly adjusted relative to each other and then fixed in their adjusted positions, a multiplicity of paired inlet orifices around the periphery of said circular chamber and adapted to direct fluid to be measured approximately tangentially against the blades of one of said meter wheels, and outlet passageways around the periphery of said circular chamber and adapted to receive discharged fluid from the blades of the other of said meter wheels.

2. The meter of claim 1 wherein said wheels are identical in configuration and are horizontally disposed, and said inlet orifices are in the lower portion of said circular chamber.

3. The meter of claim 1 wherein said inlet orifices are rectangular and tapered in the direction of fluid flow.

References Cited

UNITED STATES PATENTS 979,518    12/1910    Larrabee _____ 73—229

RICHARD C. QUEISSER, Primary Examiner

M. SMOLLAR, Assistant Examiner

PO-1050
(5/69)

UNITED STATES PATENT OFFICE
CERTIFICATE OF CORRECTION

Patent No. __3572118__      Dated __March 23, 1971__

Inventor(s) __Wilfried Hilzendegen__

It is certified that error appears in the above-identified patent and that said Letters Patent are hereby corrected as shown below:

At the following locations, "vanes" should read -- blades --,

Col. 1, line 22,
            line 41, and
            line 69.

Col. 2, lines 23 and 24,

"vane" should read -- turbine --.

Col. 3, line 7 and line 29,

"vanes" should read -- blades --.

Signed and sealed this 10th day of August 1971.

(SEAL)
Attest:

EDWARD M. FLETCHER, JR.            WILLIAM E. SCHUYLER, JR.
Attesting Officer                  Commissioner of Patents